United States Patent [19]

Wiklund

[11] 4,277,895
[45] Jul. 14, 1981

[54] APPARATUS FOR INDICATING ANGULAR POSITION IN A VERTICAL DIRECTION

[75] Inventor: Klas R. Wiklund, Täby, Sweden

[73] Assignee: AGA Aktiebolag, Lidingo, Sweden

[21] Appl. No.: 37,105

[22] Filed: May 8, 1979

[30] Foreign Application Priority Data

May 31, 1978 [SE] Sweden ............................. 7806294

[51] Int. Cl.³ ........................ G01C 9/06; G01P 15/08
[52] U.S. Cl. ..................................... 33/366; 33/391; 73/517 B
[58] Field of Search ............... 33/366, 391, 308, 309, 33/310; 73/517 B

[56] References Cited

U.S. PATENT DOCUMENTS

| 2,869,851 | 1/1959 | Sedgfield et al. | 73/517 B |
| 2,947,176 | 8/1960 | Perry | 73/517 B |
| 3,203,256 | 8/1965 | Woestemeyer | 73/517 B |
| 4,088,027 | 5/1978 | Hernandez et al. | 73/517 B |
| 4,102,202 | 7/1978 | Ferriss | 73/517 B |
| 4,131,020 | 12/1978 | Hugli et al. | 73/517 B |
| 4,136,955 | 1/1979 | Aeshlimann et al. | 33/366 |
| 4,145,929 | 3/1979 | Aske | 73/517 B |

Primary Examiner—William D. Martin, Jr.
Attorney, Agent, or Firm—Larson and Taylor

[57] ABSTRACT

An accelerometer is provided which comprises a pendulum rotatable about an axis and which is arranged for measuring vertical angles. A rotatable device which is preferably of the moving coil type is located at the axis of rotation of the pendulum. The rotational device preferably comprises magnet arrangement for providing a constant magnetic field, and a movable coil which supports the pendulum for rotation and is rotatable in the magnetic field. The angle to be determined is measured by rotating the magnet arrangement about the axis from a reference position to the desired angular position and thereafter supplying current through the coil of such strength and polarity that the coil, and thus the pendulum is rotated about the axis of rotation from the vertical reference position it would normally assume due to the forces of gravity to the angular position of the magnet arrangement. The current required to effect such rotation of the pendulum is proportional to the angle to be measured.

14 Claims, 4 Drawing Figures

APPARATUS FOR INDICATING ANGULAR POSITION IN A VERTICAL DIRECTION

FIELD OF THE INVENTION

The present invention relates to an accelerometer intended for vertical angle measuring processes.

BACKGROUND OF THE INVENTION

In surveying and cartogarphic measuring operations, it is the horizontal distance and the difference in elevation between the measuring instrument and the measurement point which are of basic importance. When making such measurements, the distance between the measuring instrument and the measurement point is the basic measurement, and in recent times this measurement is often made using electronic distance measuring instruments. The horizontal distance and the elevational differences are determined by multiplying the distance between the instrument and the measurement point by the sine and cosine respectively, of the vertical angle defined by the line of sight of the distance measuring instrument in relation to the true horizontal.

Previously, this vertical angle has often been measured with the aid of a theodolite which includes an accurately marked glass scale serving as an indicator. It is also previously known to use theodolites having accelerometers for providing angular information, wherein the earth's gravational forces are used instead of actual acceleration. A disadvantage of using accelerometers in this manner is that firstly, accelerometers of the class required for such a purpose provide a degree of accuracy of approximately $10^{cc}$ and thus are extremely expensive and complex devices. Secondly, it is the acceleration which is determined and not primarily the angular position. This means that conversion to the sine or cosine of the angular position is dependent upon the "g"-acceleration at the measuring site.

Accelerometers are usually constructed such that a mass is displaced linearly along an axis. Attempts have been made to as closely simulate this condition as possible, since it is actually the acceleration along the axis in question which is often to be measured. When this is translated to accelerometers for measuring the angular position in the vertical direction, the corresponding measurement is that of the effect exerted by the downwardly directed "g"-acceleration perpendicularly to an angularly located axis from an absolute horizontal position or line.

The highly accurate accelerometers hitherto constructed for use as angle-measuring devices have normally involved a system in which an electromagnetic or electrostatic power source is used to return a mass (a weight) to a given zero-position. Conventionally, the zero-position is sensed electromagnetically, capacitively or optically and an amplifier amplifies the resultant error signal. The current supplied to the power source is such that the force exerted by the mass as a result of the "g"-acceleration is equalized and this current is measured either directly or by measuring the current across a resistance connected in series with the power source. The measured current, or corresponding voltage, thus constitutes a measurement of the acceleration.

Instruments of this kind are generally expensive, in that, inter alia, the components used therein must be extremely accurately produced. In addition, there are demanding requirements with respect to stability and to providing a low degree of friction. It is noted that a resolution requirement of $10^{cc}$ (one revolution here is divided into 400°) is equal to $$g/64\,000 = 1.6 \cdot 10^{-5} g$$

SUMMARY OF THE INVENTION

In accordance with the invention, an acclerator apparatus is provided for indicating vertical angles which overcomes the problems discussed above. The invention basically comprises an accelerometer including a pendulum which is rotatable about an axis and which is provided with a weight on the free end thereof. A rotatable means is provided for mounting the pendulum for rotation about its axis of rotation of the pendulum under the control of a control means. In use, when the instrument has been rotated to the angular position to be measured the control means causes the pendulum to also be rotated to the angular position to be measured from a vertical reference position of the pendulum which the pendulum would normally assume because of gravity. A parameter proportional to the force required to rotate the pendulum to the angular position to be measured is substantially proportional to the sine of the angle of rotation of the instrument.

Preferably, the rotatable means is constructed in a manner similar to a conventional moving coil instrument, with the pendulum being securely connected mechanically to a movable coil which is arranged to rotate in a constant magnetic field produced by a magnet arrangement. In this preferred embodiment, the control means is arranged to supply a current through the coil of such magnitude and polarity that the coil causes a degree of rotation of the pendulum with respect to a vertical referenced which is substantially proportional to the angle to be measured, the current through the coil being representative of this angle.

In accordance with a preferred embodiment, when setting the instrument to the angular position to be measured, the magnet arrangement is arranged to be rotated about the axis of rotation of the pendulum, the magnet arrangement and the coil being so oriented that when the pendulum is rotated by the coil, the field of the coil is substantially perpendicular to the constant magnetic field produced by the magnet arrangement.

The angular position of the pendulum in relation to a vertical position is arranged to be detected by a detector which may be of an optic, electrostatic or magnetic kind and which is connected to the control means. The detector is located at a given distance from the axis of rotation of the pendulum and arranged to be rotated therearound to the angular position to be measured. The pendulum is arranged to be moved to a given position relative to the detector.

It will be appreciated that the problems associated with the prior art discussed above have thus been eliminated to a large extent by providing for rotating the mass rather than linear displacement of the mass to a given position. Perhaps the most important difference between a conventional accelerometer of the pendulum type and an accelerometer according to the invention is that in conventional accelerometers the restoring system is located on the weight itself, the weight being mounted on one end of an arm which is pivotally at the other end thereof on a fixed point. In the present invention, the restoring system is located instead at the point about which the pendulum oscillates. The position of the weight at the free end of the pendulum, or the angular position of the pendulum relative to a vertical position, is detected and a control means is provided for controlling the restoring system in such a manner that the pendulum weight is maintained in a specific position relative to a mechanically fixed system which is rotated with the instrument whose angular position is to be detected. It is noted that the instrument must still be compensated for different values of "g" from location to location, but the provision of a restoring rotary system provides a high degree of sensitivity with respect to angular position, which is what is required in the context of the purpose of the invention.

Other features and advantages of the invention will be set forth in, or apparent from, the detailed description of the preferred embodiments found hereinbelow.

BRIEF DESCRIPTION OF THE DRAWINGS

The invention will now be described with reference to the accompanying drawings, wherein.

DESCRIPTION OF THE PREFERRED EMBODIMENTS

Figure 1:
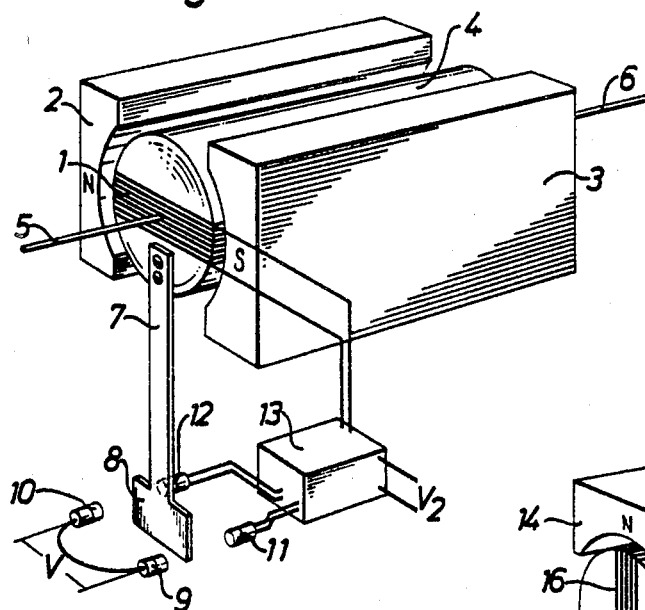
FIG. 1 is a perspective view illustrating a first embodiment of a accelerometer according to the invention.

Referring to FIG. 1, a first embodiment of an accelerometer according to the invention is illustrated. The construction of the acclerometer of FIG. 1 is analogous to that of a moving coil instrument and includes rotational or movable coil 1 disposed between two magnets 2, 3 which are arranged such that their poles of opposite polarity face each other. The magnets 2, 3 are only schematically illustrated in FIG. 1 and it will be understood that many different magnet arrangements can be used. In a moving coil instrument the most usual arrangement is one which includes a horse-shoe magnet with the moving coil disposed between the poles, and such an arrangement can also be used for the present invention. The coil 1 is wound on an elongate core 4 of ferromagnetic material. The iron core 4 is cylindrical in shape and the pole shoes of the magnets 2 and 3 are reciprocally shaped, i.e., are curved such that each pole shoe is equidistantly spaced from the iron core 4 along the entire surface thereof which the respective shoe faces. In this way, a radially directed, homogenous magnetic field is produced in the air gaps between the core 4 of the pole shoes of magnets 2, 3.

As illustrated in FIG. 1, the core winding is disposed such that the poles of the winding in the zero-position of the accelerometer extend transversely of the poles of the magnets 2, 3. Moreover, each of the two longitudinal sides of core 4 which are provided with winding turns lie close to and are equidistant from their respective magnets.

In a manner similar to a moving coil instrument, the moving coil 1 is preferably suspended from strap or wire bearing supports 5, 6 each of which engages the short or transverse sides of the coil at the center thereof. This support arrangement permits the coil 1 and core 4 to be rotated about the center position thereof. Preferably, the arrangement should be such that it not be possible to move the coil linearly.

It will be understood that the coil may also be mounted on center point bearings and it is noted that the latter arrangement provides an advantage in this embodiment in that it is difficult to avoid linear vertical displacement of the coil when using a strap bearing. Such linear movement has a direct effect on the angular position. However, with center point bearings, other problems are encountered because of the friction associated with the bearing. This friction can be reduced to a central extent by gently vibrating the coil with the pendulum.

As will be seen from FIG. 1, a pendulum arrangement 7 is mounted on one short side of the coil-core combination 1, 4 thereby causing an imbalance in the journalled system, the weight of the pendulum 7 tending to maintain the coil 1 in a position in which the windings are horizontal, as illustrated. The pendulum 7 comprises a relatively long, straight rod one end of which is attached to the core 4 of coil 1 and the other free end of which is attached to the core 4 of coil 1 and the other free end of which is provided with an enlarged or widened part in the form of a rectangular plate 8. Plate 8 extends transversely of the direction of movement of the pendulum and serves as a weight.

An indicating arrangement is located adjacent the plate 8 for indicating the zero-position of the pendulum 2. In the illustrated embodiment, this arrangement comprises a pair of light emitting diodes 9 and 10 located on one side of the plate 8 and a corresponding pair of light detectors 12 and 13 located on the other side of the plate 8. It is noted that if only two light emitting diodes and two light detectors are used in the illustrated manner, the placement should be such that, in the zero-position of pendulum 7, the plate 8 blocks a predetermined part (but less than all) of the light radiation passing between respective pairs of light emitting diodes/light detectors in order to effect an appropriate control.

The accelerator of the invention is, of course, associated with an electronic distance measuring (EDM) instrument and when the latter is set completely horizontally and thus the pendulum 7 hangs vertically downward as a result of the force of gravity, the plate 8 is located in the illustrated position, i.e., in the zero-position of the instrument. If the EMD instrument is rotated vertically, the zero-position of the instrument is also rotated and the pendulum 7 will still hang vertically as a result of gravitational forces, unless countervailing measures are taken. In this regard, it will be understood that the entire apparatus illustrated in FIG. 1 is rotated with the EDM instrument apart from the pendulum 7 which remains vertical because of gravity.

To overcome this, a direct current supplied to the coil 1 of such magnitude and polarity that the pendulum 7 is rotated to the zero position of the instrument. The magnitude of the current is determined by a control circuit 13 which amplifies the difference between the voltage outputs of the light detectors 11, 12, these voltage outputs being a function of the light radiation received by the respective detectors. The control current is supplied to the coil 1 which then acts to constantly maintain the pendulum 7 in the desired zero-position. The current flow through the coil 1 provides a satisfactory approximation of the acceleration in the direction in question, i.e., is substantially proportional to g·sine $\phi$, where g is the value of the "g"-acceleration at the location in question and where $\phi$ is the angle of deflection of the pendulum. Since it is only the angle $\phi$ which is of interest, compensation must be made for the "g"-value at the location at which the instrument is used.

In FIG. 1, the magnets 2 and 3 are shown to be arranged in a manner such that the magnetic field therebetween extends substantially horizontally when the pendulum 7 is vertical, with the zero-position of the accelerometer being located immediately below the movable coil 1, and, consequently, the coil 1 will also extend horizontally for this position. When the magnets are arranged in this manner, said magnets 2 and 3 must be relatively strong so that the earth magnetic field does not have any effect on the measuring result. As a result of the arrangement illustrated, the field in the air gap will be so strong that the instrument becomes relatively insensitive to external magnetic fields; however, despite this, the external magnetic field from the magnets 2 and 3 will affect the field in the air gap and thus will have some influence on the measuring result.

Figure 2:
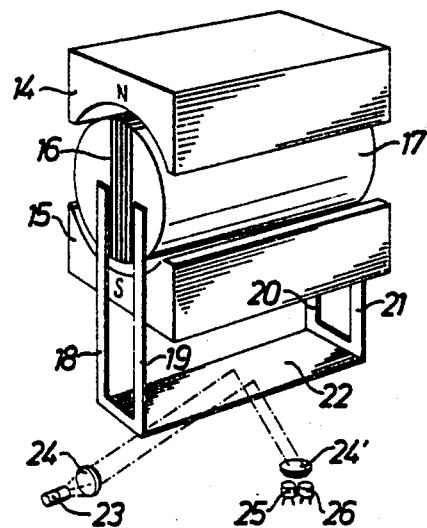
FIG. 2 is a perspective view illustrating a second embodiment of an accelerometer according to the invention.

One way of avoiding this problem is provided by the embodiment of the invention illustrated in FIG. 2, in which a pair of permanent magnets 14 and 15 are positioned such that the magnetic field therebetween extends vertically, and thus a moving coil 16 is also vertically positioned when the accelerometer indicates a zero angle. In a similar manner to the embodiment illustrated in FIG. 1, the coil 16 is wound on a ferromagnetic, soft iron core 17 and the arrangement of permanent magnets 14, 15 and moving coil 16 is, in other respects, the same as the arrangement in FIG. 1, apart from the fact that the arrangement has been rotated through 90°. It will be understood that an oblique position for the system of magnets and the coil is conceivable when the accelerometer indicates the zero angle.

The pendulum of the FIG. 2 embodiment has a different design from the pendulum of the FIG. 1 embodiment. In the embodiment of FIG. 2, the pendulum comprises vertically extending rods 18, 19 and 20, 21 which are disposed opposite sides of the short (transverse) portion of the coil 16 on the core 17, two of rods being attached, e.g., by gluing, on each side of one of the transverse sides of the coil 16 and two being similarly attached on the other side. Mounted on the end of the rods 18-21 remote from the winding 16 is a horizontal mirror 22. In the zero-position of the accelerometer a light source 23 is located such that light rays are transmitted therefrom through a lens system 24 onto the reflective surface of the mirror 22. The group of rays has a sharp lateral definition and the rays are reflected by the mirror 22 through a further lens system 24' and are focussed between a pair of light detectors 25 and 26. The detectors 24, 26 are coupled to a control circuit (not shown) of the same kind as that illustrated in FIG. 1. The control circuit is arranged to supply current to the winding 16 in a manner such as to hold the focusing point at a position which is centrally located between the light detectors 25 and 26, i.e., so that the light detectors 25, 26 receive substantially equal amounts of light from the light source 23.

The embodiment of FIG. 2 provides a substantial advantage over the embodiment of FIG. 1. Specifically, if the coil is suspended from a tensioned wire bearing support so that it is difficult to avoid some linear movement of the coil 16 and the core 17 owing to the gravitational pull of the earth, this movement will have no effect on the angular position of the pendulum, since it is the angular position of the mirror 22 which is detected and controlled. In contrast, in the arrangement illustrated in FIG. 1, linear displacement of the coil 1 has a direct effect on the set angular position of the pendulum 7. Consequently, the measuring result must be compensated to take this effect into account.

Figure 3:
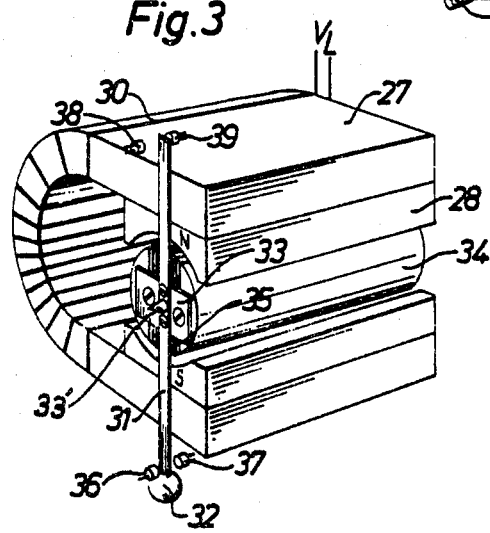
FIG. 3 is a perspective view illustrating a third embodiment of an accelerometer according to the invention.

FIG. 3 illustrates a further embodiment of an accelerometer according to the invention. In this embodiment, the permanent magnets of the previous embodiments are replaced by an electromagnet 27 having a core of soft magnetic material and being of horse-shoe configuration with poles 28 and 29 of substantially the same form and location as the permanent magnets used in the embodiment of FIG. 2. Wound on the curved part of the core 27 is a winding 30 to which a constant direct current voltage $V_L$ is supplied. A cylindrical core 34 is disposed between the pole shoes of electromagnet 27 and has a coil 35 would thereon.

In the embodiment of FIG. 3, the magnetic flux density in the air gap is less temperature-dependent than when using permanent magnets. In addition, this embodiment ensures that the instrument, even when used for a long period of time, has the same magnetic flux density in the air gap. It is noted that permanent magnets may become demagnetized to some extent when used for prolonged periods, and this influences the measuring result. More specifically, when a lower magnetic flux density is produced, the coil (i.e., coil 16 of FIG. 2) requires a higher current to obtain the same measuring result. Since the current through the coil is used as a measurement of the acceleration (i.e., the force which is to be overcome when rotating the pendulum is proportional to the sine of the angle $\phi$ between the rotated position of the pendulum and a purely vertical position thereof) it is important that the magnetic flux density be constant from one period of time to another. It should be mentioned, however, that the risk of the permanent magnets becoming demagnetized is extremely slight, and hence the embodiments illustrated in FIGS. 1 and 2 often result in an instrument which is as accurate and functions as well as the instrument illustrated in FIG. 3.

The pendulum of the FIG. 3 embodiment is somewhat different from the pendulum of the other two embodiments. In the FIG. 3 embodiment, the pendulum comprises a rod 31 having a weight 32 at one end thereof. The rod is mounted on a plate 33 which is secured to core 34 and lies over one of the short (transverse) sides of coil 35. The coil 35 and the poles 28, 29 are placed, similarlt to the embodiment of FIG. 2, in a manner such that the magnetic field extends vertically. The rod 31, which is vertical with respect to a horizontally adjusted theodolite, thus extends substantially equally on both sides of the coil 35 by virtue of the connections to plate 33 at the center of the rod. Two pairs of position detectors 36, 37 and 38, 39 are respectively disposed at locations close to the outer ends of the rod 31, with one pair at each end. Each position of the detectors comprises a light source, denoted 36 and 38 respectively, and a light detector, denoted 37 and 39 respectively. As in the other embodiments, the position detectors are rotated as the theodolite or the angle indicator is rotated. The light sources 36 and 38 are energized in a manner analogous to the light source 9 and 10 of the embodiment of FIG. 1, and the light detectors 37 and 39 are coupled to a control circuit in a manner analogous to the coupling of the light emitting diodes 11 and 12 to the control circuits 13 in the embodiment of FIG. 1. As in the FIG. 1 embodiment, the moving coil 35 is supplied with current from a control circuit (not shown), in a manner such that the pendulum 31 is maintained in the zero-position. As in the embodiment of FIG. 2, the detector arrangement 36 to 39 in this embodiment provides correct angular setting of the pendulum rod 31 when the core 34 and associated pendulum rod 31 are supported by a tensioned wire bearing support. However, in this embodiment, the core 34 is shown mounted on center point bearings 33'.

Figure 4:
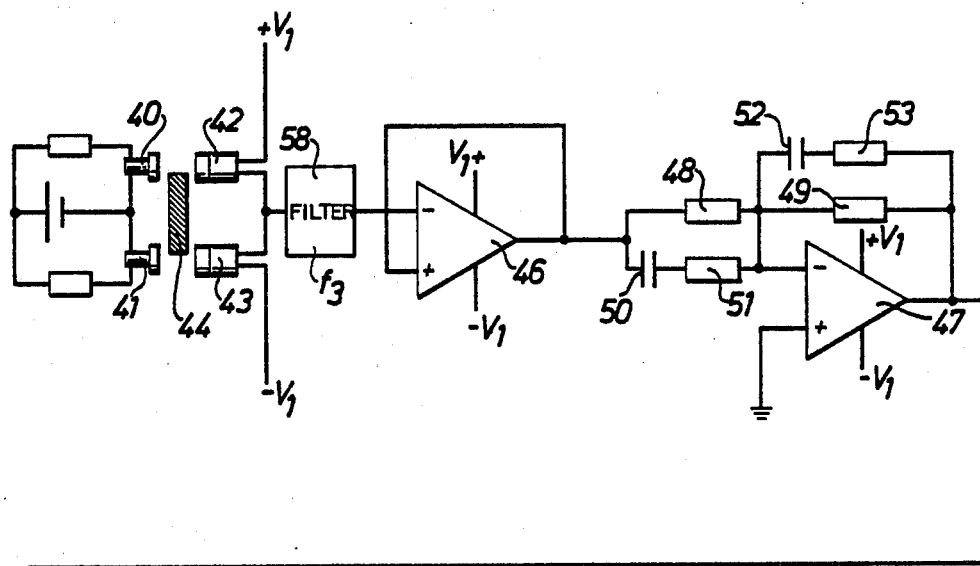
FIG. 4 is a circuit diagram of a control circuit and a circuit for producing the measuring value of an accelerometer according to the invention.
Figure 4:
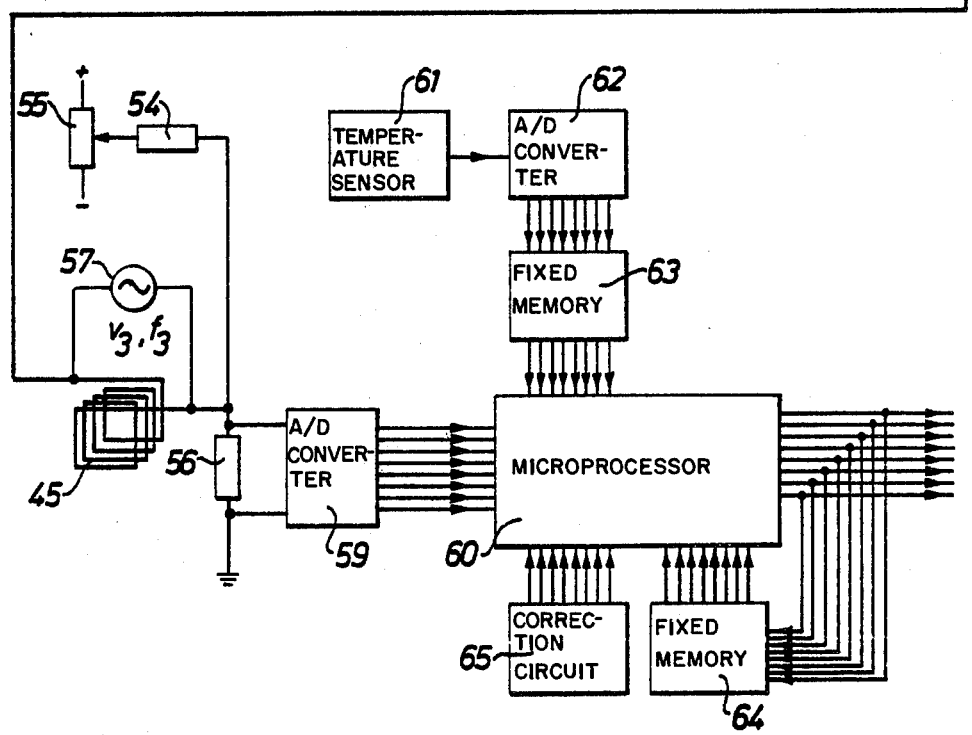

FIG. 4 illustrates a preferred embodiment of a control circuit adapted for use with an accelerometer according to the invention. Two light sources 40 and 41 are placed on one side of a movable plate 44 immediately at the edge thereof. In this embodiment, the plate 44 corresponds to plate 8 in FIG. 1. Arranged on the other side of the plate 44 are two light detectors 42 and 43, detectors 42 being arranged to detect the light from light source 40 and detector 43 being arranged to detect the light from light source 41. The light sources 40, 41 and detectors 42, 43 are disposed immediately adjacent to the edge of the plate 44 in a manner such that part of the light from each source is blocked or shielded by the plate 44. Thus, the detectors 42, 43 do not detect the whole of the light from respective light sources 40 and 41, and the detectors 42, 43 will detect more light or less light as the plate 44 moves.

Connected to the detectors 42 and 43 is a control circuit which, by supplying current of suitable magnitude and polarity through the coil 45 of the accelerometer acts to maintain the plate 44 in a position such that the amount of light reaching the detector 42 from the light source 40 is substantially equal to that reaching the detector 43 from the light source 41. The light detectors 42 and 43 are connected in series between a positive voltage source $+V_1$ and a negative voltage source $-V_1$. The junction point between the detectors 42, 43 is connected to the negative input of an operational amplifier 46 which is connected to provide unity gain. Amplifier 46 provides an input impedance which prevents the detectors 42, 43 from being effected by subsequent stages, i.e., provides high impedance isolation for the detectors.

The output of the amplifier 46 is coupled to an amplifying stage comprising second high gain operational amplifier 47 and a servofilter of the phase-conductive type. This servofilter comprises two branches, one in which a resistance 48 is connected in parallel with a series-connected capacitor 50 resistance 51, and a second in which a resistance 49 is connected in parallel with a series-connected capacitor 52 and resistance 53. One branch is connected between the output of the amplifier 46 and the negative input of the amplifier 47, while the other branch is connected between the input and output of the amplifier 47, as shown. The output of the amplifier 47 is connected in series with the moving coil 45. A resistance 56 is connected between coil 45 and ground. The positive input of the amplifier 47 is also connected to ground while amplifier 47 itself is supplied with current from the voltage sources $+V_1$, $-V_1$. In this way, the amplifier 47 amplifies the voltage difference between the input voltage applied to the negative input thereof and ground. This highly amplified voltage differential is applied to the coil 45 and across the resistance 56. Depending upon whether the voltage difference is positive or negative, the coil 45 will act to more the plate 44 downwardly or upwardly as viewed in FIG. 4. The coupling or junction point between the coil 45 and resistance 56 is also connected via a resistance 54 to the center top of a potentiometer 55 so as to provide corresponding correction of the measurement obtained for the angle corresponding to the current through the winding 45.

As illustrated in FIG. 4, the circuit may optionally include a source of alternating voltage 57 of voltage $V_3$ and frequency $f_3$, connected across moving coil 45, and a narrow band filter 58 which is connected between the detector arrangement 42, 43 and the amplifier 46. The voltage $v_3$ is of an amplitude and frequency such that the coil 45 and the associated pendulum 44 are gently vibrated. This vibration renders the instrument more sensitive and eliminates the static friction when setting the instrument. Such friction may have an undesired effect on the measurement result, particularly when the instrument is mounted on a center point bearing. In addition, the pendulum 44 is set very accurately between the position detectors 40, 42 and 41, 43 respectively. Since the pendulum vibrates, there is obtained an alternating voltage of frequency $f_3$ from the detector arrangement 42, 43 and this frequency is filtered out by the narrow band filter 58, thus preventing any effect on the remainder of the control circuit.

An analog-to-digital (A/D) converter 59 is connected across the resistance 56. The digital output signal of A/D converter 59 is coupled to an input of a microprocessor 60. Certain parts of the microprocessor 60, such as a pair of fixed memories 63 and 64, which form part of the actual microprocessor 60, are illustrated separately since they constitute units which are particularly significant in explaining the invention. The signal produced by the converter 59 is not truly representative of the measured angle, and thus requires various corrections. Since the ambient temperature particularly influences the detector and magnetic field, as well as the length of the pendulum, a temperature sensor 61 is provided to enable approximate correction. The analog output signal therefrom is supplied to a further analog-to-digital converter 62 whose digital output signal is supplied to the address input of a fixed memory (ROM) 63. Each address in ROM 63 has written therein a correction value which is correlated with the measured temperature. This correction value is supplied to a second input of the microprocessor 60. Connected to a third input of the microprocessor 60 is a further fixed memory (ROM) 64, in which specific correction values are stored. These correction values can be provided during the manufacture of an instrument, separate from the instrument being considered here, by accurately calibrating against a reference instrument. Particularly where the instrument is to be mounted on a tensioned wire bearing arrangement, a predetermined correction can be provided through the fixed memory 64 for movement of the coil generally in the direction of the acceleration through a linear displacement. As previously mentioned, this results in a small error and an output signal which does not fully accurately represent the acceleration, since the pendulum does not lie exactly in the intended angular position. This error must be corrected, and the correction values therefor stored in the fixed memory 64 are so adapted that the correction results in the accuracy required.

A further approach to correcting the accuracy is provided by a correcting circuit 65, by which analog correction of the instrument is accomplished by, for example, manually setting and/or regulating the indication of the instrument for a known reference angular value, for measurement of the "g"-acceleration at the place in question and for other specific correction variables. The correction circuit 65 supplies a correction value, which can be regulatd by the operator or by some separate automatic device, to a fourth input of the microprocessor 60. The digital correction circuit 65 is not absolutely necessary, and can be replaced by the analog correction circuit formed by resistor 54 and potentiometer 55.

The microprocessor 60 calculates in an angular value with the aid of information from the converter 59 and the memory 63 and, where desired, the correction value from the correction circuit 65, and produces the calculated angle value digitally at the output thereof. The calculated value is used as an address to a storage location in the memory 64 at which a correction value for this particular, calculated angular value is written. This correction value is fed to the microprocessor 60, which corrects the previously calculated value using the correction value. Subsequent hereto the microprocessor 60 is either supplied with the corrected representation for the angular value, which may be the actual angular value, or the sine, cosine, or some other suitable trigonometrical representation therefor. Calculated values may also be temporarily stored in the microprocessor 60 for use in calculations of the horizontal and the vertical distance, which can be also be carried out by the microprocessor 60, as soon as a distance to an intended point is measured and the value thereof fed into the microprocessor.

Many modifications are possible within the scope of the invention. For example, it should be noted that the block diagrams and coupling diagrams illustrated in FIG. 4 are only intended to provide an example of a control circuit suitable for the accelerometer and that such a control circuit may take many different forms.

Although the invention has been described with respect to exemplary embodiments thereof, it will be understood that variations and modifications can be effected in the embodiments without departing from the scope or spirit of the invention.

I claim:

1. An accelerometer for use in vertical angle measurements, said accelerometer comprising a pendulum which is rotatable about an axis and which includes a weight at the free end thereof, rotable means for mounting said pendulum for rotation about said axis, and a control means for rotating the pendulum to the angular position to be measured with respect to a vertical reference of the pendulum, said rotatable means comprising a movable coil mounted on a core and rotatable relative to a magnet arrangement disposed adjacent thereto, said pendulum being mechanically secured to said movable coil and said core being rotatable in a constant magnetic field produced by said magnet arrangement, said control means supplying a current through the coil of such polarity and magnitude that the coil provides a degree of rotation of the pendulum, with respect to a vertical reference position thereof, substantially equal to the angle to be measured, said current through said coil being representative of the angle to be measured, said accelerometer further comprising detector means for detecting the angular position of the pendulum with respect to a vertical reference position, converter means connected to the output of said detector means for producing a digital electrical signal in accordance with the output of said detector means, and a calculating means, including a correcting means having stored correction values corresponding to predetermined digital signal values, for receiving said digital electrical signals and for producing an output directly related to the true angular value to be measured based on the signals from the converter means and the corresponding value stored by the correcting means.

2. An accelerometer according to claim 1, wherein the magnet arrangement is rotated about the axis of rotation of the pendulum when setting the instrument to the angular position to be measured, the magnet arrangement and the coil being so oriented that when the pendulum is rotated by said coil, the magnetizing field of the coil is substantially perpendicular to the constant magnetic field produced by the magnet arrangement.

3. An accelerometer according to claim 1 further comprising detector means for detecting the angular position of the pendulum with respect to a vertical reference position, said detector means being located at a given distance from the axis of rotation of the pendulum and arranged to be rotated therearound to the angular position to be measured, and said control means causing rotation of the pendulum to a given position relative to the detector means.

4. An accelerometer according to claim 1 wherein said detector means comprises an optical detector means.

5. An accelerometer according to claim 1, wherein said detector means detects the position of a given part of the pendulum.

6. An accelerometer according to claim 1, wherein said detector means detects the angle of inclination of the pendulum relative to a reference line.

7. An accelerometer according to claim 1, wherein the movable coil is supported by a tensioned wire bearing support.

8. An accelerometer according to claim 11 further comprising a correction means connected to the control circuit for providing adjustment of the indicated value of the current through the movable coil.

9. An accelerometer according to claim 1, wherein the coil is supported by center-point bearings, said accelerometer further including means for superimposing an alternating current on the current supplied from the control circuit through the coil so as to gently vibrate said coil together with the pendulum.

10. An accelerometer as claimed in claim 1 wherein said detector means is located at a given distance from the axis of rotation of the pendulum and is arranged to be rotated therearound to the angular position to be measured, said control means causing rotation of the pendulum to a given position relative to the detector means.

11. An accelerometer for use in vertical angle measurements, said accelerometer comprising a pendulum which is rotatable about an axis and which includes a weight at the free end thereof rotatable means for mounting said pendulum for rotation about said axis, control means for rotating said pendulum to the angular position to be measured with respect to a vertical reference position of the pendulum, detector means for detecting the angular position of the pendulum with respect to a vertical reference position, converter means for converting a parameter constituting an indication of the angle of rotation into a digital electrical signal, a temperature sensor, and a calculating means, including temperature responsive correcting means controlled by said temperature sensor for providing correction values in accordance with the ambient temperature, for receiving said digital signal and for producing an output directly related to the true angular value based on the digital electrical signal from the converter means and the correction value provided by said temperature responsive correcting means.

12. An accelerometer as claimed in claim 11 further comprising further correcting means having stored correction values corresponding to particular values of said digital electrical signal, said calculating means producing an output based on the signals from said converter means, the correction values provided by said temperature responsive correcting means and the correction values stored by said further correcting means.

13. An accelerometer according to claim 11, wherein the rotatable means comprising a movable coil mounted on a core and rotatable relative to a magnet arrangement disposed adjacent thereto, said pendulum being mechanically secured to said movable coil and said core being rotatable in a constant magnetic field produced by said magnet arrangement, said control means supplying a current through the coil of such polarity and magnitude that the coil provides a degree of rotation of the pendulum, with respect to a vertical reference position thereof, substantially equal to the angle to be measured, the current through the coil being representative of the said angle to be measured.

14. An accelerometer according to claim 11 wherein said calculating means produces an output corresponding to at least one trigonometric function of the true angular value.

* * * * *